(12) United States Patent
Fujita (10) Patent No.: US 10,011,177 B2
(45) Date of Patent: Jul. 3, 2018

(54) PROJECTION DISPLAY SYSTEM AND METHOD OF CONTROLLING PROJECTION DISPLAY DEVICE

(71) Applicant: FUJIFILM Corporation, Tokyo (JP)

(72) Inventor: Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/668,702

(22) Filed: Aug. 4, 2017

(65) Prior Publication Data

US 2017/0334291 A1   Nov. 23, 2017

Related U.S. Application Data

(63) Continuation of application No. PCT/JP2016/051468, filed on Jan. 19, 2016.

(30) Foreign Application Priority Data

Feb. 23, 2015 (JP) ................. 2015-033053

(51) Int. Cl.
*B60K 35/00* (2006.01)
*G03B 21/20* (2006.01)
(Continued)

(52) U.S. Cl.
CPC ............ *B60K 35/00* (2013.01); *G03B 21/206* (2013.01); *G03B 21/2053* (2013.01);
(Continued)

(58) Field of Classification Search
CPC .............. G03B 21/006; G03B 21/2033; G03B 21/2053; H04N 9/3155; H04N 9/3182;
(Continued)

(56) References Cited

U.S. PATENT DOCUMENTS

| 6,750,832 B1 * | 6/2004 | Kleinschmidt | ........ B60K 35/00 345/7 |
| 7,561,966 B2 * | 7/2009 | Nakamura | ........... G01C 21/365 340/461 |

(Continued)

FOREIGN PATENT DOCUMENTS

| CN | 101286012 | 10/2008 |
| CN | 103543596 | 1/2014 |

(Continued)

OTHER PUBLICATIONS

"International Search Report (Form PCT/ISA/210) of PCT/JP2016/051468", dated Apr. 19, 2016, with English translation thereof, pp. 1-2.

(Continued)

*Primary Examiner* — Sultan Chowdhury
(74) *Attorney, Agent, or Firm* — JCIPRNET (57) ABSTRACT

A projection display system and a control method of controlling a projection display device capable of preventing degradation of visibility or occurrence of a sense of discomfort at a boundary between respective projection areas due to dimming are provided. In a system including a plurality of projection display devices (100A, 100B, 100C) that project image light onto a plurality of areas in one projection surface, each of the plurality of projection display devices includes a brightness detection unit (47b), and a first control unit (52) that controls a projection condition for the image light that is projected on the basis of detected brightness information, and a second control unit (53) that performs control to cause a projection condition for the image light of the second projection display device (100B) to match a projection condition determined by the first control unit (52) of the first projection display device (100A).

20 Claims, 7 Drawing Sheets

(51) Int. Cl.
  *G03B 29/00* (2006.01)
  *H04N 9/31* (2006.01)
  *G02B 27/01* (2006.01)

(52) U.S. Cl.
  CPC ...... *G03B 29/00* (2013.01); *B60K 2350/2052* (2013.01); *B60K 2350/2069* (2013.01); *G02B 27/0101* (2013.01); *G02B 2027/0118* (2013.01); *H04N 9/3147* (2013.01); *H04N 9/3155* (2013.01)

(58) Field of Classification Search
  CPC ............... H04N 9/3185; H04N 9/3194; G09G 2320/0233; G09G 2320/0242; G09G 2320/0626; G09G 2320/0686; G02B 27/01; G02B 27/017; G02B 27/0101; G02B 27/0172
  See application file for complete search history.

(56) References Cited

U.S. PATENT DOCUMENTS

| | | |
|---|---|---|
| 8,681,136 B2 | 3/2014 | Kubota |
| 8,947,217 B2 | 2/2015 | Moussa et al. |
| 9,298,071 B2 | 3/2016 | Kim et al. |
| 2009/0017424 A1* | 1/2009 | Yoeli ............ G02B 27/01 434/44 |

FOREIGN PATENT DOCUMENTS

| | | |
|---|---|---|
| CN | 103959165 | 7/2014 |
| JP | H05200163 | 8/1993 |
| JP | H07-266925 | 10/1995 |
| JP | 2008-096805 | 4/2008 |
| JP | 2009-216808 | 9/2009 |
| JP | 2011-230625 | 11/2011 |
| JP | 2012-066646 | 4/2012 |
| JP | 2013-137355 | 7/2013 |
| JP | 2013-148901 | 8/2013 |
| WO | 2014077524 | 5/2014 |

OTHER PUBLICATIONS

"International Preliminary Report on Patentability (Form PCT/IPEA/409) of PCT/JP2016/051468" dated Oct. 27, 2016, with English translation thereof, pp. 1-6.

"Office Action of China Counterpart Application," with machine English translation thereof, dated Feb. 24, 2018, p. 1-p. 23.

\* cited by examiner

PROJECTION DISPLAY SYSTEM AND METHOD OF CONTROLLING PROJECTION DISPLAY DEVICE

CROSS-REFERENCE TO RELATED APPLICATIONS

This application is a Continuation of PCT International Application No. PCT/JP2016/051468 filed on Jan. 19, 2016, which claims priority under 35 U.S.C § 119(a) to Japanese Patent Application No. 2015-033053 filed on Feb. 23, 2015. Each of the above application(s) is hereby expressly incorporated by reference, in its entirety, into the present application.

BACKGROUND OF THE INVENTION

1. Field of the Invention

The present invention relates to a projection display system and a method of controlling a projection display device.

2. Description of the Related Art

A head-up display (HUD) device for a car that projects projection light onto a windshield of a car or a combiner arranged near the windshield inside the car, which is used as a screen, and displays an image is known (See JP2013-148901A, JP2011-230625A, JP2013-137355A, and JP2012-066646A). If this HUD is used, a user inside the car can view an image displayed on the windshield or the like by image light projected from the HUD and scenery ahead of the own vehicle on the back side of the windshield or the like in a superimposed manner.

JP2013-148901A describes a human-machine interface including a plurality of HUDs mounted on a vehicle.

JP2011-230625A describes a vehicle display device including first and second displays. Further, JP2011-230625A describes that luminance control of the second display is performed on the basis of luminance setting of the first display.

JP2013-137355A describes a display system using a plurality of projection display devices. Further, JP2013-137355A describes that a plurality of images are displayed in an overlapped manner in order to eliminate a sense of discomfort due to gaps among a plurality of images.

JP2012-066646A describes a vehicle HUD that controls brightness of a display according to ambient brightness.

SUMMARY OF THE INVENTION

When an HUD is mounted on a vehicle, various types of visible information are required to be displayed at various points, respectively. Further, since a windshield of a vehicle onto which an image is projected has a large area, a sufficient required display function cannot be realized by only one HUD.

Therefore, for example, an environment in which a plurality of display devices are mounted on a vehicle and simultaneously used is assumed, as in JP2011-230625A and JP2013-137355A. Further, it is also assumed that a plurality of projection areas are used as partially overlapped or arranged at adjacent positions, as in JP2013-137355A.

On the other hand, when an HUD is used for a vehicle, visibility of a display greatly changes due to an influence on brightness of external light incident from the outside of a vehicle like sunlight. Therefore, controlling display brightness according to ambient brightness is required, as in JP2012-066646A, for example.

If a sensor that detects the amount of external light or the like, and a dimming mechanism that automatically adjusts the brightness of the image light are included in each of the plurality of HUDs mounted on the car, and projection areas of the plurality of HUDs are arranged at adjacent positions, the brightness may temporarily differ at a boundary between two adjacent projection areas in some cases.

For example, at a timing such as sunset, the brightness of each image light of the two HUDs is sequentially switched at different timings due to a difference in an incidence angle of external light incident on respective sensors of the two HUDs.

Therefore, a difference occurs in brightness of two adjacent image light beams, and a user feels a sense of discomfort. In particular, in a case where a plurality of adjacent projection areas are connected to form a projection area having a large area as a whole, single image light may be projected onto a point across a boundary between the two projection areas. A difference in brightness at this boundary is likely to lead to degradation of visibility or occurrence of a high sense of discomfort.

The present invention has been made in view of the above circumstances, and an object of the present invention is to provide a projection display system and a method of controlling a projection display device capable of preventing degradation of visibility or occurrence of a sense of discomfort at a boundary between respective projection areas due to dimming even in a case where projection areas of a plurality of independent projection display devices are arranged at adjacent positions or a plurality of adjacent projection areas are connected.

A projection display system of the present invention is a projection display system including a plurality of projection display devices that project image light onto each of a plurality of areas in one projection surface, in which each of the plurality of projection display devices includes a brightness detection unit that detects brightness of the area onto which the image light is projected, and a first control unit that controls a projection condition for the image light that is projected onto the area on the basis of brightness information detected by the brightness detection unit, any one of the plurality of projection display devices is a first projection display device, and a projection display device other than the first projection display device among the plurality of projection display devices is a second projection display device, a second control unit performs control to cause a projection condition for the image light of the second projection display device to match a projection condition determined by the first control unit of the first projection display device, a switching unit switches between enabling and disabling of control of the second control unit, and a power supply control unit individually controls power supplies of the plurality of projection display devices, in which the switching unit switches control of the second control unit to enabling only in a case where a power supply of a projection display device that projects image light onto an area adjacent to an area onto which the first projection display device projects image light is on by the power supply control unit.

Further, a projection display system of the present invention is a projection display system including a plurality of projection display devices that project image light onto each of a plurality of areas in one projection surface, in which the plurality of projection display devices are projection display devices mounted on a car, each of the plurality of projection display devices includes a brightness detection unit that detects brightness of the area onto which the image light is projected, and a first control unit that controls a projection condition for the image light that is projected onto the area on the basis of brightness information detected by the brightness detection unit, any one of the plurality of projection display devices is a first projection display device, and a projection display device other than the first projection display device among the plurality of projection display devices is a second projection display device, the first projection display device includes a second control unit that performs control to cause a projection condition for the image light of the second projection display device to match a projection condition determined by the first control unit of the first projection display device, and the first projection display device is a projection display device that projects image light onto an area closest to a driver's seat of the car among the plurality of areas in the projection surface.

A control method of controlling a plurality of projection display devices that project image light onto each of a plurality of areas in one projection surface of the present invention, in which each of the plurality of projection display devices includes a brightness detection unit that detects brightness of the area onto which the image light is projected, and a first control unit that controls a projection condition for the image light that is projected onto the area on the basis of brightness information detected by the brightness detection unit, and any one of the plurality of projection display devices is a first projection display device, and a projection display device other than the first projection display device among the plurality of projection display devices is a second projection display device, is a control method comprising a control step of performing control to cause a projection condition for the image light of the second projection display device to match a projection condition determined by the first control unit of the first projection display device, and a power supply control step of individually controlling power supplies of the plurality of projection display devices, in which the control step in the control unit is executed only in a case where the power supply of the first projection display device, and the power supply of the projection display device that projects image light onto an area adjacent to an area onto which image light is projected by the first projection display device are on in the power supply control step.

Further a control method of controlling a plurality of projection display devices that project image light onto each of a plurality of areas in one projection surface of the present invention, in which each of the plurality of projection display devices includes a brightness detection unit that detects brightness of the area onto which the image light is projected, and a first control unit that controls a projection condition for the image light that is projected onto the area on the basis of brightness information detected by the brightness detection unit, any one of the plurality of projection display devices is a first projection display device, and a projection display device other than the first projection display device among the plurality of projection display devices is a second projection display device, the plurality of projection display devices are projection display devices mounted on a car, and the first projection display device is a projection display device that projects image light onto an area closest to a driver's seat of the car among the plurality of areas in the projection surface, is a control method comprising a control step of performing control to cause a projection condition for the image light of the second projection display device to match a projection condition determined by the first control unit of the first projection display device.

According to the present invention, it is possible to prevent degradation of visibility or occurrence of a sense of discomfort at a boundary between respective projection areas due to dimming even in a case where projection areas of the plurality of independent projection display devices are arranged at adjacent positions or a plurality of adjacent projection areas are connected.

DESCRIPTION OF THE PREFERRED EMBODIMENTS

Hereinafter, an embodiment of the present invention will be described with reference to the drawings.

Figure 1:
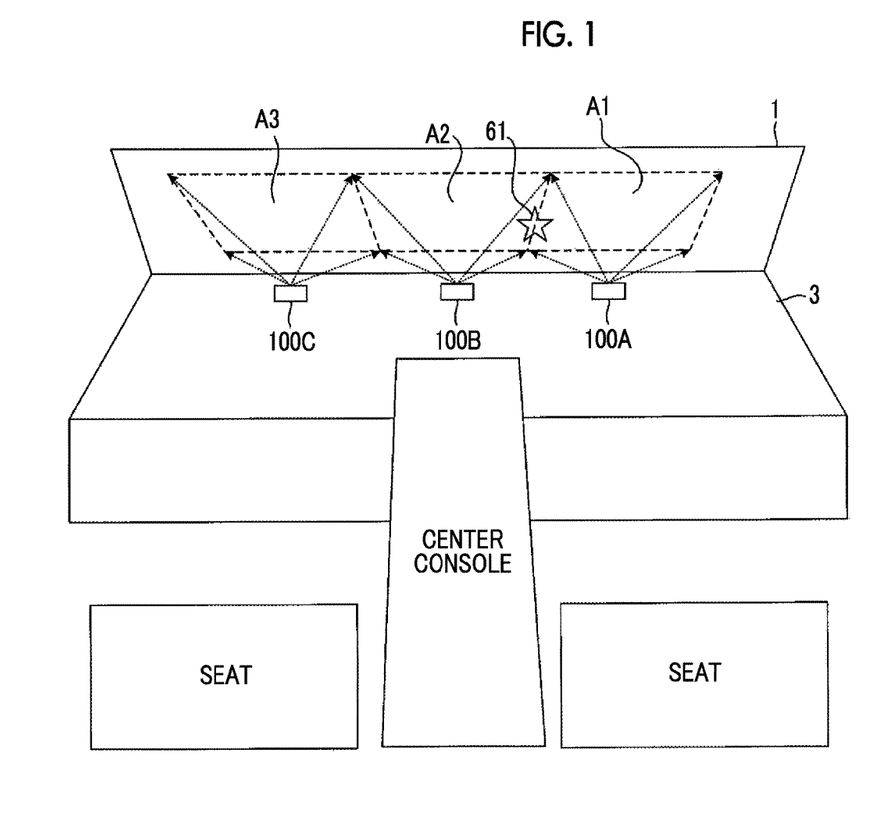
FIG. 1 is a perspective view illustrating a specific example of a state in which a front of a driver's seat is viewed from the top side inside a vehicle on which a projection display system of an embodiment of the present invention is mounted.

FIG. 1 is a diagram illustrating a specific example of a state in which a front of a driver's seat is viewed from the top side inside a vehicle on which a projection display system of an embodiment of the present invention is mounted.

The projection display system illustrated in FIG. 1 includes a plurality of (three in the illustrated example) projection display devices 100A, 100B, and 100C respectively configured as HUDs. In the example of FIG. 1, the projection display device 100A is arranged on the right side of a dashboard 3 of a car, that is, in front of the driver's seat, the projection display device 100B is arranged in a center portion of the dashboard 3, and the projection display device 100C is arranged on the left side of the dashboard 3. Although an example in which a projection display system is applied to a right-handle car is illustrated in FIG. 1, the projection display system is similarly applicable to a left-handle car. In the case of the left-handle car, the projection display device 100A is arranged on the left side of the dashboard 3 of the car, that is, in front of the driver's seat, the projection display device 100B is arranged in the center portion of the dashboard 3, and the projection display device 100C is arranged on the right side of the dashboard 3.

Further, in the projection display system illustrated in FIG. 1, an area covering substantially an entire surface of a windshield 1 of the car is one projection surface, and this projection surface is divided into three areas including a right area A1, a central area A2, and a left area A3. Assignment is performed so that the projection display device 100A projects image light onto the area A1, the projection display device 100B projects image light onto the area A2, and the projection display device 100C projects image light onto the area A3.

The three areas A1, A2, and A3 are arranged adjacent to each other and arranged side by side as illustrated in FIG. 1. Therefore, by interworking the three projection display devices 100A, 100B, and 100C, it is possible to display a desired image at an arbitrary point of the entire wide surface of the windshield 1.

Figure 2:
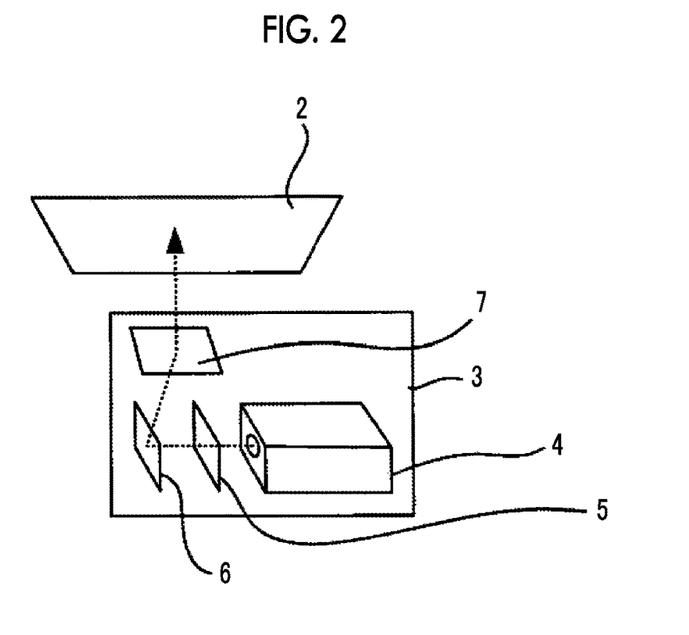
FIG. 2 is a schematic diagram illustrating a schematic configuration of a projection display device 100A illustrated in FIG. 1.

FIG. 2 is a schematic diagram illustrating a schematic configuration of the projection display device 100A illustrated in FIG. 1. Since configurations of the projection display device 100B and the projection display device 100C are the same as that of the projection display device 100A, illustration thereof will be omitted.

As illustrated in FIG. 2, each of the projection display devices 100A, 100B, and 100C includes the display unit 4 built in the dashboard 3 of the car, a projection unit including a diffusion plate 5, a reflection mirror 6, and a magnifying mirror 7, and a combiner 2 attached to an inner surface of the windshield 1 of the car.

The diffusion plate 5 diffuses light according to image information for projection output from the display unit 4 to convert the light according to the image information into a plane light source. "Light according to image information" herein is also referred to as "image light".

The reflection mirror 6 reflects the image light diffused by the diffusion plate 5 to the magnifying mirror 7.

The magnifying mirror 7 magnifies the image light reflected by the reflection mirror 6 and projects the image light onto the combiner 2.

The combiner 2 included in the projection display device 100A is attached to the area A1 onto which the projection display device 100A projects the image light. The combiner 2 included in the projection display device 100B is attached to the area A2 onto which the projection display device 100B projects the image light. The combiner 2 included in the projection display device 100C is attached to the area A3 onto which the projection display device 100C projects the image light.

The combiner 2 is a projection surface present on the windshield 1 of the car and reflects the image light projected from the magnifying mirror 7. The driver of the car can visually recognize information on the driving or the like by viewing the image light reflected by the combiner 2. Further, the combiner 2 has a function of reflecting the image light projected from the magnifying mirror 7 and simultaneously transmitting light from the outside (external environment) of the windshield 1. Therefore, the driver can view the projected image based on the image light projected from the magnifying mirror and scenery of the external environment outside the windshield 1 in a superimposed manner.

Figure 3:
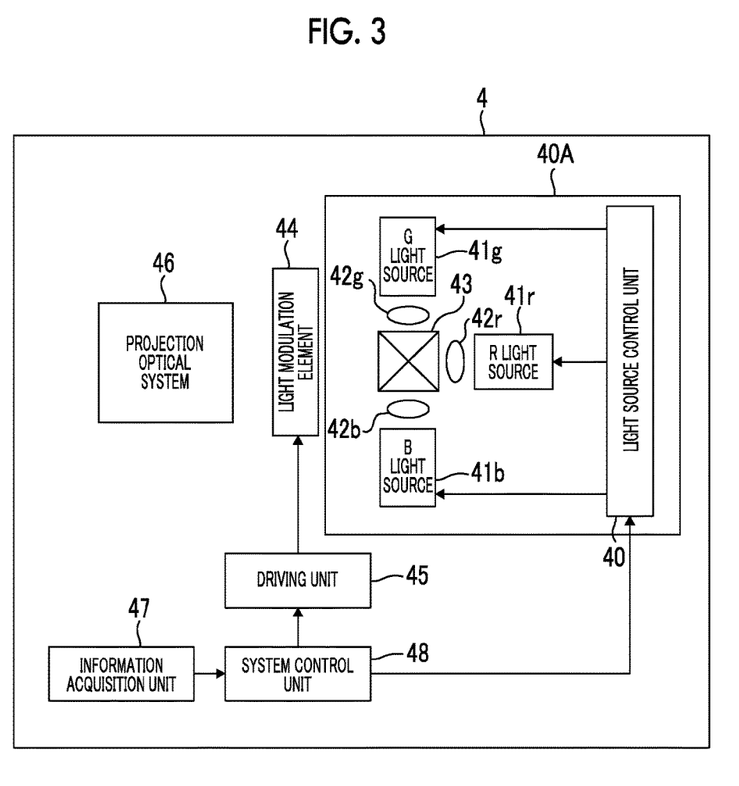
FIG. 3 is a diagram illustrating an internal configuration of a display unit 4 illustrated in FIG. 2.

FIG. 3 is a diagram illustrating an internal configuration of the display unit 4 illustrated in FIG. 2.

The display unit 4 includes a light source unit 40A, a light modulation element 44, a driving unit 45 that drives the light modulation element 44, a projection optical system 46, an information acquisition unit 47, and a system control unit 48 that performs overall control of all of these.

The light source unit 40A includes a light source control unit 40, an R light source 41r that is a red light source that emits red light, a G light source 41g that is a green light source that emits green light, a B light source 41b that is a blue light source that emits blue light, a dichroic prism 43, a collimator lens 42r provided between the R light source 41r and the dichroic prism 43, a collimator lens 42g provided between the G light source 41g and the dichroic prism 43, and a collimator lens 42b provided between the B light source 41b and the dichroic prism 43.

The dichroic prism 43 is an optical member for guiding light emitted from each of the R light source 41r, the G light source 41g, and the B light source 41b to the same optical path. The optical member having such a function is not limited to the dichroic prism. For example, a cross dichroic mirror may be used.

The dichroic prism 43 transmits the red light collimated by the collimator lens 42r and emits the red light to the light modulation element 44. Further, the dichroic prism 43 reflects the green light collimated by the collimator lens 42g and emits the green light to the light modulation element 44. Further, the dichroic prism 43 reflects the blue light collimated by the collimator lens 42b and emits the blue light to the light modulation element 44.

As the R light source 41r, the G light source 41g, and the B light source 41b, light emitting elements such as a laser or a light emitting diode (LED) are used. Although an HUD including three light sources including the R light source 41r, the G light source 41g, and the B light source 41b is illustrated in this embodiment, the number of light sources may be two, or four or more.

The light source control unit 40 performs control to cause light to be emitted from each of the R light source 41r, the G light source 41g, and the B light source 41b.

The light modulation element 44 modulates the light emitted from the dichroic prism 43, and emits light (red image light, blue image light, and green image light) according to image information to the projection optical system 46.

As the light modulation element 44, for example, a liquid crystal on silicon (LCOS), a digital micromirror device (DMD), a micro electro mechanical systems (MEMS) element, a liquid crystal display element, or the like can be used.

The driving unit 45 drives the light modulation element 44 according to image information input from the system control unit 48, and causes light (red image light, blue image light, and green image light) according to the image information to be emitted to the projection optical system 46. The driving unit 45 and the light modulation element 44 constitute a light modulation unit.

The projection optical system 46 is an optical system for projecting image light emitted from the light modulation element 44 onto the diffusion plate 5.

The system control unit 48 controls the light source control unit 40 and the driving unit 45. Further, the system control unit 48 also performs control to interlock operations of the projection display devices 100A, 100B, and 100C.

The information acquisition unit 47 detects brightness of the area onto which the image light is projected (an area of the windshield 1 onto which the projection display device projects the image light), or acquires various types of information to be displayed, as necessary.

Figure 4:
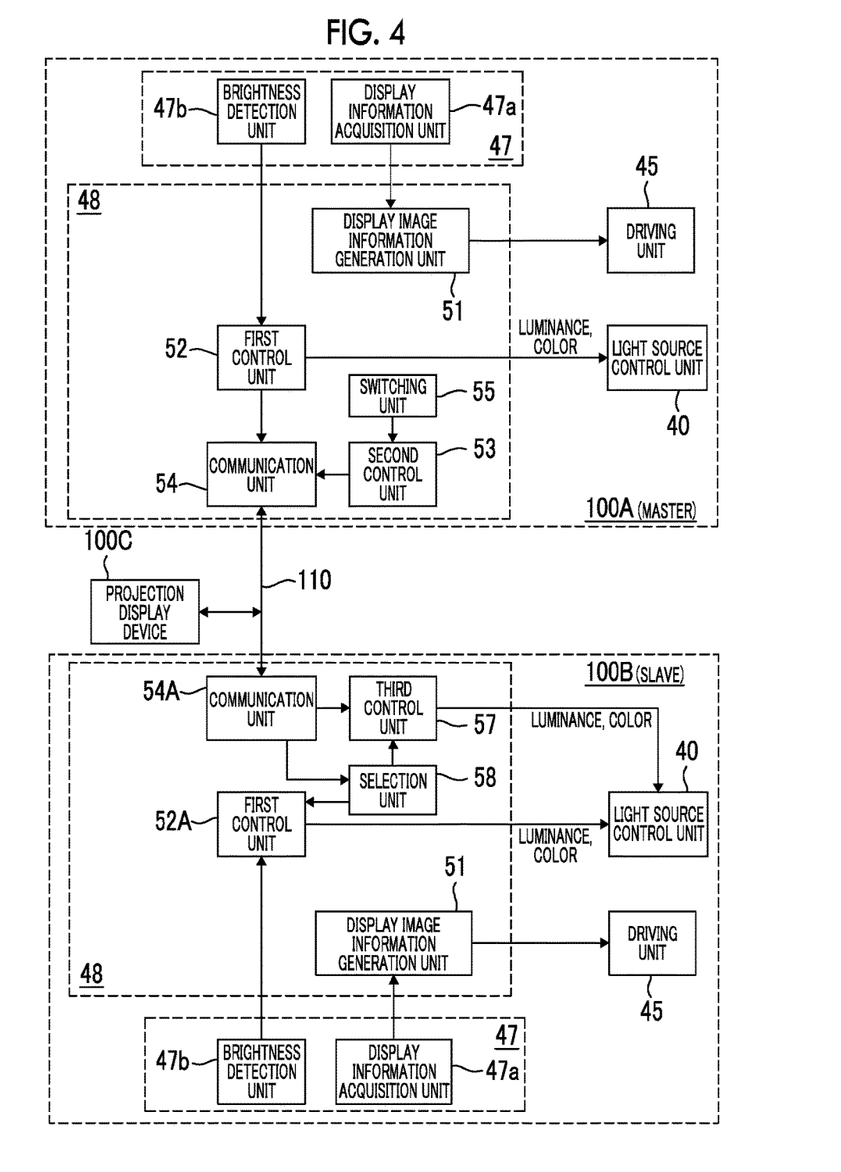
FIG. 4 is a diagram illustrating main components of the entire projection display system illustrated in FIG. 1.

FIG. 4 is a diagram illustrating main components of the entire projection display system illustrated in FIG. 1. Since an internal configuration of the projection display device 100C is the same as that of the projection display device 100B, detailed illustration is omitted.

As illustrated in FIG. 4, the three projection display devices 100A, 100B, and 100C included in the projection display system are connected to each other via a communication line 110. As illustrated in FIG. 4, the information acquisition unit 47 included in the display unit 4 of each of the three projection display devices 100A, 100B, and 100C includes a display information acquisition unit 47a and a brightness detection unit 47b.

The display information acquisition unit 47a has a function of acquiring various types of information to be displayed by the HUD. For example, speed information indicating a travel speed of a vehicle, information indicating instructions for turning right, turning left, or the like that are output from a car navigation device (not illustrated), information on an image of the outside of the vehicle imaged by an vehicle-mounted camera (not illustrated) or a result of performing image processing on the image, and the like can be acquired.

The brightness detection unit 47b includes, for example, an illuminance sensor arranged on the surface of the dashboard 3, and detects illuminance of light such as sunlight that is transmitted through a specific area of the windshield 1 and is incident from the outside of the vehicle.

The brightness detection unit 47b included in the projection display device 100A detects brightness of the area A1 (illuminance of the area A1). The brightness detection unit 47b included in the projection display device 100B detects brightness of the area A2 (illuminance of the area A2). The brightness detection unit 47b included in the projection display device 100C detects brightness of the area A3 (illuminance of the area A3).

As illustrated in FIG. 4, the system control unit 48 included in the display unit 4 of the projection display device 100A includes a display image information generation unit 51, a first control unit 52, a second control unit 53, a communication unit 54, and a switching unit 55.

The display image information generation unit 51 generates image information for a display on the basis of the various types of information acquired by the display information acquisition unit 47a. The image information generated by the display image information generation unit 51 is input to the driving unit 45. Under the control of the driving unit 45, the light projected by the light source unit 40A is modulated according to the image information, and the image light according to the image information is incident on the projection optical system 46.

In the configuration illustrated in FIG. 4, the projection display device 100A that uses the area A1 closest to a driver's seat of the vehicle as the projection surface is assigned as a first projection display device that operates as a master in the projection display system. Further, the other projection display devices 100B and 100C are assigned as second projection display devices that operate as slaves.

The first control unit 52 of the projection display device 100A controls a projection condition for the image light to be projected onto the area A1 assigned to the own device on the basis of brightness information detected by the brightness detection unit 47b in the own device.

The projection condition herein is a parameter that affects visibility of the image light to be projected, and includes, for example, luminance of the image light and tint of the image light. The tint is information on color indicated by hue, lightness, and saturation. The first control unit 52 provides a control signal for controlling the parameter affecting visibility of the image light, such as one or both of the luminance and the tint, to the light source control unit 40.

The second control unit 53 of the projection display device 100A performs display interlocking control to match projection condition for the image light projected by each of the projection display device 100B and the projection display device 100C operating as slaves with the projection condition determined by the first control unit 52 in the own device. Further, the second control unit 53 of the projection display device 100A performs individual display control to control the projection condition for the image light projected by each of the projection display device 100A, the projection display device 100B, and the projection display device 100C to be a projection condition based on the basis of the brightness information detected by the brightness detection unit 47b.

In the above description, the projection display device 100A functions as the first projection display device, and any one or both of the projection display device 100B and the projection display device 100C function as the second projection display device.

In the display interlocking control, the second control unit 53 causes the information on the luminance and the tint, which is the projection condition for the image light determined by the first control unit 52, to be transmitted from the communication unit 54 to the projection display device 100B and the projection display device 100C. Further, in the display interlocking control, the second control unit 53 causes an interlocking control signal for controlling a selection unit 58 of each of the projection display device 100B and the projection display device 100C to be described below to be transmitted from the communication unit 54 to the projection display device 100B and the projection display device 100C.

In the individual display control, the second control unit 53 causes an individual control signal for controlling the selection unit 58 of each of the projection display device 100B and the projection display device 100C to be described below to be transmitted from the communication unit 54 to the projection display device 100B and the projection display device 100C.

The switching unit 55 switches between enabling and disabling of the display interlocking control of the second control unit 53.

For example, when a display interlocking switch (not illustrated) that can be operated by a driver or the like is turned on, the switching unit 55 outputs an enable signal for enabling display interlocking control to the second control unit 53, and when the display interlocking switch is turned off, the switching unit 55 outputs a disable signal for disabling the display interlocking control to the second control unit 33. When the enable signal is input, the second control unit 53 performs the display interlocking control. When the disable signal is input, the second control unit 53 disables the display interlocking control and performs the individual display control.

The communication unit 54 transfers information necessary for the display interlocking control and the individual display control via the communication line 110. Although the communication unit 54 is assumed to perform wired communication using the communication line 110, the communication unit 54 may perform wireless communication.

The first control unit 52A of each of the projection display device 100B and the projection display device 100C controls the projection condition for the image light to be projected onto the area (A2 or A3) assigned to the own vehicle on the basis of the brightness information detected by the brightness detection unit 47b in the own device.

The third control unit 57 of each of the projection display device 100B and the projection display device 100C performs control to match the projection condition for the image light to be projected onto the area (A2 or A3) assigned to the own device with the projection condition received from the projection display device 100A.

The selection unit 58 enables any one of the first control unit 52A and the third control unit 57 according to the interlocking control signal or the individual control signal transmitted from the projection display device 100A.

When receiving the interlocking control signal, the selection unit 58 disables the first control unit 52A and enables the third control unit 57. When receiving the individual control signal, the selection unit 58 enables the first control unit 52A and disables the third control unit 57.

Each function of the information acquisition unit 47 and the system control unit 48 illustrated in FIG. 4 can be implemented using, for example, a microcomputer or an electric circuit mainly including a logic circuit that realizes the same function.

Figure 5:
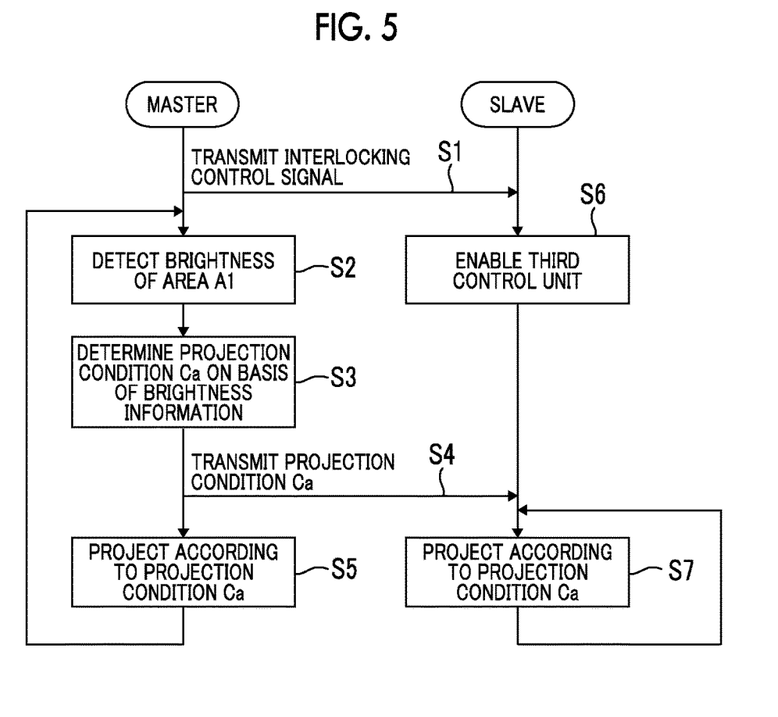
FIG. 5 is a flowchart illustrating an operation when a display interlocking switch is on in the projection display system illustrated in FIG. 1.

FIG. 5 is a flowchart illustrating an operation when a display interlocking switch (not illustrated) is on in the projection display system illustrated in FIG. 1.

When the display interlocking switch is on, an enable signal is output to the second control unit 53. According to the enable signal, the second control unit 53 transmits the interlocking control signal to the projection display device 100B and the projection display device 100C via the communication unit 54 (step S1).

The selection unit 58 of each of the projection display device 100B and the projection display device 100C that have received the interlocking control signal enables the third control unit 57 and disables the first control unit 52A according to this interlocking control signal (step S6).

After step S1, the brightness of the area A1 is detected by the brightness detection unit 47b of the projection display device 100A (step S2), and a projection condition Ca is determined by the first control unit 52 of the projection display device 100A on the basis of the brightness (step S3).

When the projection condition Ca is determined, the second control unit 53 of the projection display device 100A transmits the projection condition Ca to the projection display device 100B and the projection display device 100C (step S4).

After step S4, the first control unit 52 of the projection display device 100A controls the light source control unit 40 so that the determined projection condition Ca is set, and the image light is projected onto the area A1 from the projection display device 100A under the determined projection condition Ca (step S5). After step S5, the process returns to step S2.

The third control unit 57 of each of the projection display device 100B and the projection display device 100C that have received the projection condition Ca transmitted in step S4 controls the light source control unit 40 so that the received projection condition Ca is set, and the image light is projected onto the area A2 and the area A3 from the projection display device 100B and the projection display device 100C under the determined projection condition Ca (step S7). The third control unit 57 of each of the projection display device 100B and the projection display device 100C waits for reception of a new projection condition after step S7, and performs the process of step S7 again when receiving the projection condition.

Figure 6:
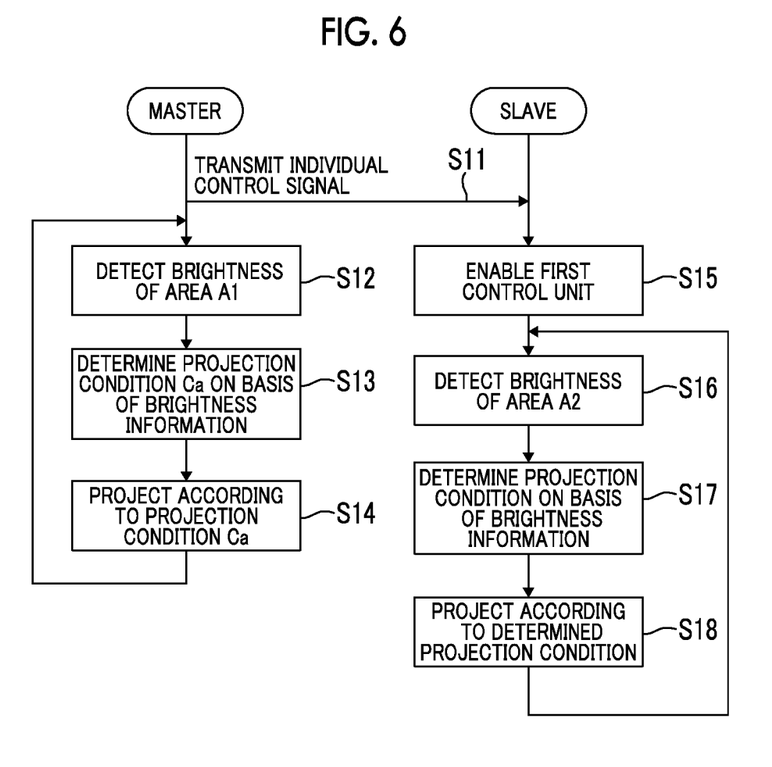
FIG. 6 is a flowchart illustrating an operation when a display interlocking switch is off in the projection display system illustrated in FIG. 1.

FIG. 6 is a flowchart illustrating the operation in the case where the display interlocking switch is off in the projection display system illustrated in FIG. 1.

When the display interlocking switch is off, a disable signal is output to the second control unit 53. Accordingly, the second control unit 53 controls the individual control signal to the projection display device 100B and the projection display device 100C via the communication unit 54 according to this disable signal (step S11).

The selection unit 58 of each of the projection display device 100B and the projection display device 100C which have received the individual control signal disables the third control unit 57 and enables the first control unit 52A according to this individual control signal (Step S15).

After step S11, the brightness of the area A1 is detected by the brightness detection unit 47b of the projection display device 100A (step S12), and the projection condition Ca is determined by the first control unit 52 of the projection display device 100A on the basis of the brightness (step S13).

When the projection condition Ca is determined, the first control unit 52 of the projection display device 100A controls the light source control unit 40 so that the determined projection condition Ca is set, and the image light is projected onto the area A1 from the projection display device 100A under the determined projection condition Ca (step S14). After step S14, the process returns to step S12.

When the first control unit 52A is enabled in step S15, the brightness of the area A2 (or A3) is detected by the brightness detection unit 47b of the projection display device 100B (or 100C) (step S16), and the projection condition is determined by the first control unit 52A of the projection display device 100B (or 100C) on the basis of this brightness (step S17).

If the projection condition is determined in step S17, the first control unit 52A of the projection display device 100B (or 100C) controls the light source control unit 40 so that the determined projection condition is set, and the image light is projected onto the area A2 (or A3) from the projection display device 100B (or 100C) under the determined projection condition (step S18). After step S18, the process returns to step S16.

Next, a specific example of a use environment of the projection display system will be described. In the example used in FIG. 1, the projection display device 100A projects the image light onto the area A1, the projection display device 100B projects the image light onto the area A2, and the projection display device 100C projects the image light onto the area A3. The areas A1, A2, and A3 are arranged adjacent to each other. Therefore, by interlocking the projection display devices 100A, 100B, and 100C, a desired image can be displayed at a desired position in a wide range across the substantially entire area of the windshield 1 by connecting the three areas A1 to A3.

Thus, for example, one image 61 may be displayed across two areas A1 and A2, like an image 61 illustrated in FIG. 1.

Meanwhile, since the projection display devices 100A to 100C are arranged at positions separated from one another, a difference occurs among the illuminance detected by an illuminance sensor of the projection display device 100A, illuminance detected by an illuminance sensor of the projection display device 100B, and illuminance detected by the illuminance sensor of the projection display device 100C.

Further, in a case where the projection display devices 100A to 100C independently perform control of the projection condition, a difference in luminance of the image or the like occurs in a portion belonging to a range on the right side and a portion belonging to a range on the left side from a boundary between the areas A1 and A2 in the image 61 illustrated in FIG. 1 due to the difference occurring in illuminances detected by the respective devices. Therefore, the driver or the like feels a sense of discomfort in this display.

However, in a case where the projection display system performs the operation illustrated in FIG. 5, luminance or tint of the image light projected onto the area A1 by the projection display device 100A assigned as the master and luminance or tint of the image light projected onto the area A2 by the projection display device 100B assigned as the slave are controlled to be the same.

Thus, in the image 61 illustrated in FIG. 1, which is displayed at a position across the two areas A1 and A2, the difference does not occur in luminance, tint, or the like of the image on the left and right sides of the boundary between the areas A1 and A2.

If there is a great difference in luminance of the image light to be projected onto the adjacent areas A1 to A3, a driving operation is likely to be adversely affected, but preferable results can be obtained in terms of safety by uniformly controlling the luminance of the image light to be projected onto the areas A1 to A3. Further, if there is a great difference in tint of the image light to be projected to the adjacent areas A1 to A3, a sense of discomfort may be provided to the driver, but the sense of discomfort can be reduced by uniformly controlling the tint of the image light to be projected onto the areas A1 to A3.

Further, the projection display device 100A that detects the illuminance of the area A1 closest to a seating position of the driver among the areas A1 to A3 is the master, that is, the first projection display device, making it possible to control the luminance or the tint of the projected image according to an actual driving environment of the driver, and preferable results are obtained in terms of safety.

In a case where the projection display system performs the operation illustrated in FIG. 6, the above-described effects cannot be obtained. However, for example, in a case where a use form in which a person sitting in the driver's seat and a person sitting in a passenger seat cause information to be individually displayed (for example, a form in which the passenger in the passenger seat views a video in the area A3, and the driver sitting in the driver's seat confirms information necessary for driving in the area A1) is adopted, the operation illustrated in FIG. 6 preferably enables a display with optimal luminance or tint to be provided to each person. In the projection display system of this embodiment, since free switching can be performed between the operations of FIG. 5 and FIG. 6, the projection display system can be used according to the use form.

Figure 7:
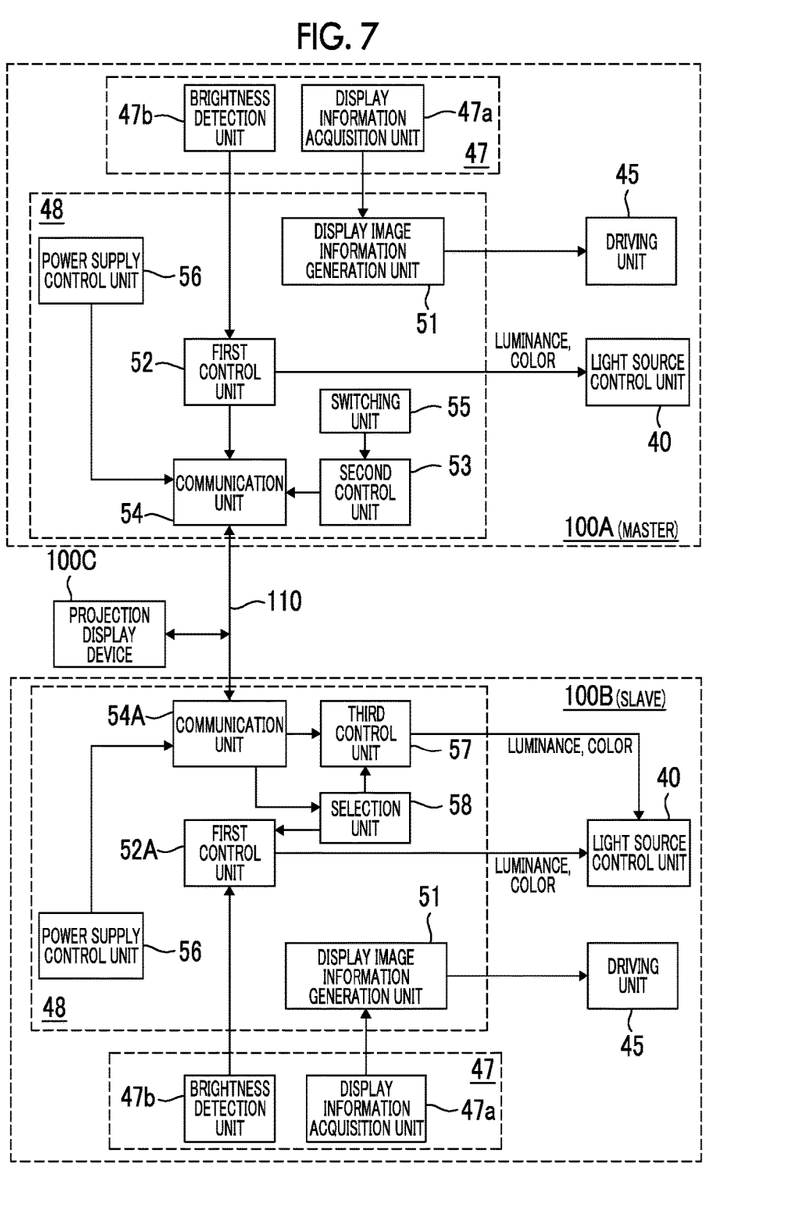
FIG. 7 is a diagram corresponding to FIG. 4 and illustrating a modification example of the projection display system illustrated in FIG. 1.

FIG. 7 is a diagram illustrating a modification example of the system configuration illustrated in FIG. 4. In this modification example, the projection display devices 100A, the projection display device 100B, and the projection display device 100C have a configuration in which the power supply can be individually turned on and off by an operation unit (not illustrated). Further, in FIG. 7, a power supply control unit 56 is added to the system control unit 48 of each of the projection display devices 100A, the projection display device 100B, and the projection display device 100C, unlike FIG. 4.

The power supply control unit 56 controls on or off of the power supply of the own device (any one of 100A, 100B, and 100C) according to an operation of the operation unit (not illustrated). Further, a power supply state of the own device is identified, and power supply state information indicating an identification result is output.

The switching unit 55 of the projection display device 100A in the modification example illustrated in FIG. 7 acquires a power supply state information from the projection display device 100B that projects the image light onto an area (the area A2 in FIG. 1) adjacent to the area A1 corresponding to the projection display device 100A, and determines whether or not the power supply of the projection display device 100B is on, on the basis of the power supply state information.

The switching unit 55 outputs the enable signal to the second control unit 53 in a case where the power supply of the projection display device 100B is on and outputs the disable signal to the second control unit 53 in a case where the power supply of the projection display device 100B is off.

According to this modification example, for example, in a case where only the power supply of the projection display device 100B is off, the projection conditions are individually controlled in the projection display device 100A and the projection display device 100C. On the other hand, in a case where the power supplies of the projection display device 100A and the projection display device 100B are on and the power supply of the projection display device 100C is off, the projection of the image light is performed according to the same projection condition (projection condition determined in the projection display device 100A) in the projection display device 100A and the projection display device 100B.

That is, in a use environment in which all of the three projection display devices 100A, 100B, and 100C are simultaneously used or the two projection display devices 100A and 100B are simultaneously used to perform a display of a large screen, it is possible to improve visibility by performing the operation of FIG. 6.

Further, when the display of a large screen is not used, for example, the power supply of the central projection display device 100B is turned off, and in a state in which a person on a passenger seat and a person on a driver's seat separately use the projection display devices 100C and 100A, an interlocking function are automatically turned off. Accordingly, it is possible to individually optimize the projection conditions of the projection display devices 100C and 100A.

This disclosed embodiment is to be considered as being illustrative and not restrictive in all respects. The scope of the present invention is defined by claims rather than the foregoing description, and is intended to include any modifications within a meaning and a range equivalent to the claims.

For example, a vehicle-mounted system is assumed in the above embodiment, but the present invention can be applied to various display systems other than the vehicle-mounted system, which perform a display of a large screen using projection. That is, in a case where a plurality of the projected images are connected and displayed using a plurality of projection display devices, a difference occurs in luminance or tint at boundaries among the plurality of areas at which the projected images are connected, and a sense of discomfort occurs in a vehicle-mounted apparatus and the like. Accordingly, adoption of the present invention is expected.

Although the projection display device 100A corresponding to the area A1 closest to the driver's seat is the master in the above description, the projection display device 100B or the projection display device 100C may be the master. Further, although three projection display devices are assumed in the above embodiment, the number of projection display devices can be further increased, if necessary.

As described above, the following matters are disclosed herein.

The disclosed projection display system is a projection display system including a plurality of projection display devices that project image light onto each of a plurality of areas in one projection surface, in which each of the plurality of projection display devices includes a brightness detection unit that detects brightness of the area onto which the image light is projected, and a first control unit that controls a projection condition for the image light that is projected onto the area on the basis of brightness information detected by the brightness detection unit, any one of the plurality of projection display devices is a first projection display device, and a projection display device other than the first projection display device among the plurality of projection display devices is a second projection display device, and a second control unit performs control to cause a projection condition for the image light of the second projection display device to match a projection condition determined by the first control unit of the first projection display device.

The disclosed projection display system is a projection display system in which the projection condition includes luminance of the image light.

The disclosed projection display system is a projection display system in which the projection condition includes tint of the image light.

The disclosed projection display system is a projection display system in which the plurality of projection display devices are mounted on a car, and the first projection display device projects image light onto an area closest to a driver's seat of the car among the plurality of areas in the projection surface.

The disclosed projection display system is a projection display system further comprising a switching unit that switches between enabling and disabling of control of the second control unit.

The disclosed projection display system is a projection display system further comprising: a power supply control unit that individually controls power supplies of the plurality of projection display devices, in which the plurality of projection display devices include three projection display devices, and the switching unit switches control of the second control unit to enabling only in a case where a power supply of a projection display device that projects image light onto an area adjacent to an area onto which the first projection display device projects image light is on by the power supply control unit.

The disclosed method of controlling a projection display device is a control method of controlling a plurality of projection display devices that project image light onto each of a plurality of areas in one projection surface, in which each of the plurality of projection display devices includes a brightness detection unit that detects brightness of the area onto which the image light is projected, and a first control unit that controls a projection condition for the image light that is projected onto the area on the basis of brightness information detected by the brightness detection unit, any one of the plurality of projection display devices is a first projection display device, and a projection display device other than the first projection display device among the plurality of projection display devices is a second projection display device, and the control method includes a control step of performing control to cause a projection condition for the image light of the second projection display device to match a projection condition determined by the first control unit of the first projection display device.

The disclosed method of controlling a projection display device is a control method in which the projection condition includes luminance of the image light.

The disclosed method of controlling a projection display device is a control method in which the projection condition includes tint of the image light.

The disclosed method of controlling a projection display device is a control method in which the plurality of projection display devices are projection display devices mounted on a car, and the first projection display device projects image light onto an area closest to a driver's seat of the car among the plurality of areas in the projection surface.

The disclosed method of controlling a projection display device is a control method further comprising a power supply control step of individually controlling power supplies of the plurality of projection display devices, in which the plurality of projection display devices include three projection display devices, and the control step is executed only in a case where the power supplies of the first projection display device, and the projection display device that projects image light onto an area adjacent to an area onto which image light is projected by the first projection display device are on in the power supply control step.

EXPLANATION OF REFERENCES

1: windshield
2: combiner
4: display unit
40: light source control unit
40A: light source unit
44: light modulation element
45: driving unit
46: projection optical system
47b: brightness detection unit
52, 52A: first control unit
53: second control unit
54: communication unit
55: switching unit
56: power supply control unit
100A, 100B, 100C: projection display device
A1, A2, A3: area

What is claimed is:

1. A projection display system comprising:
a plurality of projection display devices that project image light onto each of a plurality of areas in one projection surface,
wherein each of the plurality of projection display devices includes a brightness detection unit that detects brightness of the area onto which the image light is projected, and a first control unit that controls a projection condition for the image light that is projected onto the area on the basis of brightness information detected by the brightness detection unit,
any one of the plurality of projection display devices is a first projection display device, and a projection display device other than the first projection display device among the plurality of projection display devices is a second projection display device,
a second control unit performs control to cause the projection condition for the image light of the second projection display device to match the projection condition determined by the first control unit of the first projection display device,
a switching unit that switches between enabling and disabling of control of the second control unit, and
a power supply control unit that individually controls power supplies of the plurality of projection display devices,
wherein the switching unit switches control of the second control unit to enabling only in a case where a power supply of the projection display device that projects image light onto an area adjacent to an area onto which the first projection display device projects image light is on by the power supply control unit.

2. A projection display system comprising:
a plurality of projection display devices that project image light onto each of a plurality of areas in one projection surface,
wherein the plurality of projection display devices are projection display devices mounted on a car,
each of the plurality of projection display devices includes a brightness detection unit that detects brightness of the area onto which the image light is projected, and a first control unit that controls a projection condition for the image light that is projected onto the area on the basis of brightness information detected by the brightness detection unit,
any one of the plurality of projection display devices is a first projection display device, and a projection display device other than the first projection display device among the plurality of projection display devices is a second projection display device,
a second control unit performs control to cause the projection condition for the image light of the second projection display device to match the projection condition determined by the first control unit of the first projection display device, and
the first projection display device is the projection display device that projects image light onto an area closest to a driver's seat of the car among the plurality of areas in the projection surface.

3. The projection display system according to claim 2, further comprising:
a switching unit that switches between enabling and disabling of control of the second control unit.

4. The projection display system according to claim 3, further comprising:
a power supply control unit that individually controls power supplies of the plurality of projection display devices,
wherein the switching unit switches control of the second control unit to enabling only in a case where a power supply of a projection display device that projects image light onto an area adjacent to an area onto which the first projection display device projects image light is on by the power supply control unit.

5. The projection display system according to claim 1, wherein the projection condition includes a luminance of the image light.

6. The projection display system according to claim 2, wherein the projection condition includes a luminance of the image light.

7. The projection display system according to claim 3, wherein the projection condition includes a luminance of the image light.

8. The projection display system according to claim 1, wherein the projection condition includes a tint of the image light.

9. The projection display system according to claim 2, wherein the projection condition includes a tint of the image light.

10. The projection display system according to claim 1, wherein the plurality of projection display devices includes the first projection display device, the second projection display device and a third projection display device.

11. The projection display system according to claim 2, wherein the plurality of projection display devices includes the first projection display device, the second projection display device and a third projection display device.

12. A control method of controlling the plurality of projection display devices that project image light onto each of the plurality of areas in one projection surface of the projection display system according to claim 1, in which
each of the plurality of projection display devices includes the brightness detection unit that detects brightness of the area onto which the image light is projected, and the first control unit that controls the projection condition for the image light that is projected onto the area on the basis of brightness information detected by the brightness detection unit, and
any one of the plurality of projection display devices is the first projection display device, and the projection display device other than the first projection display device among the plurality of projection display devices is the second projection display device,
the control method comprising:
a control step of performing control to cause the projection condition for the image light of the second projection display device to match the projection condition determined by the first control unit of the first projection display device, and
a power supply control step of individually controlling power supplies of the plurality of projection display devices,
wherein the control step is executed only in a case where the power supplies of the first projection display device, and the projection display device that projects image light onto an area adjacent to an area onto which image light is projected by the first projection display device are on in the power supply control step.

13. A control method of controlling the plurality of projection display devices that project image light onto each of the plurality of areas in one projection surface of the projection display system according to claim 2, in which
the plurality of projection display devices are projection display devices mounted on a car, and
each of the plurality of projection display devices includes the brightness detection unit that detects brightness of the area onto which the image light is projected, and the first control unit that controls a projection condition for the image light that is projected onto the area on the basis of brightness information detected by the brightness detection unit, and
any one of the plurality of projection display devices is the first projection display device, and the projection display device other than the first projection display device among the plurality of projection display devices is the second projection display device,
the first projection display device is a projection display device that projects image light onto an area closest to the driver's seat of the car among the plurality of areas in the projection surface,
the control method comprising:
a control step of performing control to cause the projection condition for the image light of the second projection display device to match the projection condition determined by the first control unit of the first projection display device.

14. The control method according to claim 13, further comprising:
a power supply control step of individually controlling power supplies of the plurality of projection display devices,
wherein the control step is executed only in a case where the power supplies of the first projection display device, and the projection display device that projects image light onto an area adjacent to an area onto which image light is projected by the first projection display device are on in the power supply control step.

15. The control method according to claim 12, wherein the projection condition includes a luminance of the image light.

16. The control method according to claim 13, wherein the projection condition includes a luminance of the image light.

17. The control method according to claim 12, wherein the projection condition includes a tint of the image light.

18. The control method according to claim 13, wherein the projection condition includes a tint of the image light.

19. The control method according to claim 12, wherein the plurality of projection display devices includes the first projection display device, the second projection display device and a third projection display device.

20. The control method according to claim 13, wherein the plurality of projection display devices includes the first projection display device, the second projection display device and a third projection display device.

* * * * *